Patented Sept. 21, 1943

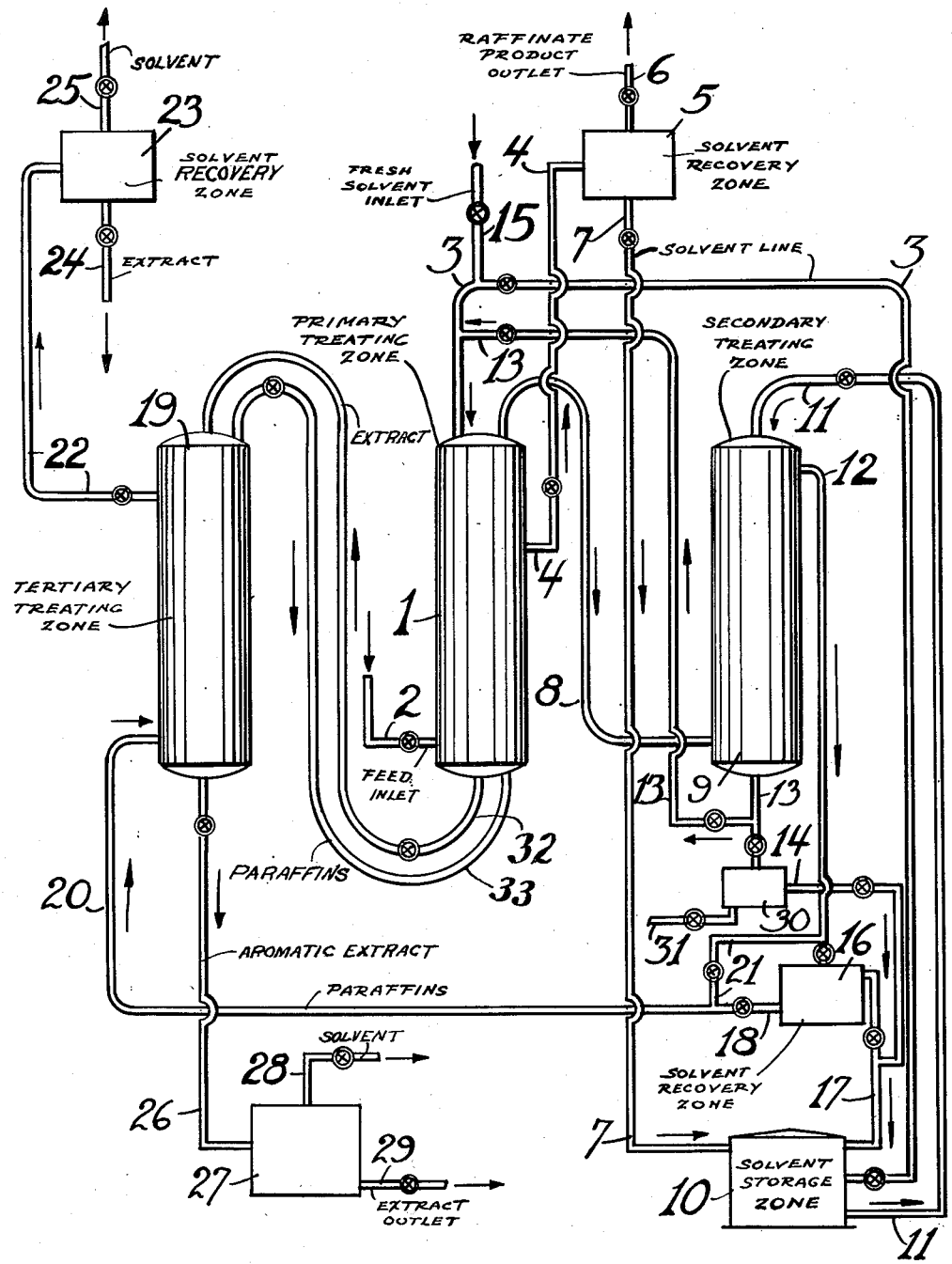

2,330,054

UNITED STATES PATENT OFFICE 2,330,054

REFINING OF MINERAL OILS

Henry J. Hibshman, Plainfield, N. J., assignor to Standard Oil Development Company, a corporation of Delaware Application May 24, 1941, Serial No. 394,987

4 Claims. (Cl. 196—13)

The present invention is concerned with the refining of mineral oils. The invention more particularly relates to an improved process for the segregation of petroleum oils into their respective chemical types, utilizing selective solvents. In accordance with the present invention, an oil is treated with a solvent having a preferential selectivity for the relatively more aromatic and olefinic type constituents as compared with the relatively more paraffinic type constituents under conditions to secure the formation of a raffinate phase and a solvent extract phase. The respective phases are separated, the more paraffinic constituents segregated from the raffinate phase and combined with the solvent extract under conditions to secure a further separation of the extract oil constituents.

It is known in the art to treat oils, as for example, petroleum oils, with various selective solvents or solvent mixtures which are characterized by having the ability to segregate the relatively more paraffinic type oil constituents from the relatively more aromatic type oil constituents. In these processes solvents of the class of solvents which have a preferential selectivity for the relatively more aromatic type constituents are usually employed. Solvents of this class are, for example, phenol, furfural, nitro benzene, sulfur dioxide, cresol, aniline, beta beta dichlor diethyl ether, and the like. It is also known to employ other substances of the class of liquefied normally gaseous hydrocarbons, in combination with the above-described class of solvents.

In these solvent treating processes the oil and the solvent are contacted by various means, as for example, by batch or by semi-batch operations. However, the usual method of treating the oil with the solvent is to contact the oil and solvent in a countercurrent treating tower process in which the heavier phase, usually the solvent, is introduced at the top of a countercurrent treating tower, while the lighter phase, usually the oil, is introduced at the center or at the bottom section of the tower. Efficient contact between the countercurrently flowing phases is secured by suitable distributing and contacting means, such as by contact masses, distributing plates, pierced plates, and the like. Temperature and pressure conditions are maintained in the tower to secure the formation of a relatively solvent-poor or raffinate phase highly paraffinic in nature and a solvent-rich or solvent extract phase highly aromatic in nature. The respective phases are segregated and removed from the tower, after which the solvent is separated from the extract oil and raffinate oil by any suitable means, usually by a distillation operation, a re-extraction operation, or by a washing operation.

These operations have been entirely satisfactory for securing separation between constituents varying widely in molecular weight and chemical structure. However, in some cases certain solvents possessing high selectivity are completely miscible with the desired extract product. In such cases it is impossible to obtain extract reflux and therefore impossible to obtain an extract of the desired purity. In the case of certain solvents this may occur with wide as well as narrow boiling fractions. Specifically, it is well recognized that it is possible to separate mono-olefins and diolefins from paraffins using sulfur dioxide as the selective solvent. On the other hand, it is not possible to obtain diolefins entirely free of mono-olefins by a similar procedure using sulfur dioxide unless a solvent substantially immiscible with the sulfur dioxide be employed to work the mono-olefins out of the extract.

Thus, various attempts have been made and processes suggested for increasing the selectivity of known solvents, such as by the addition of solvent modifying agents. Other processes have also been employed, such as maintaining a temperature gradient throughout the reaction zone and various modifications of the same. For example, in order to segregate particular constituents present in the solvent extract phase it has been suggested that this phase be contacted with another solvent or the phase cooled or re-extracted with a smaller volume of the same solvent in order to secure the desired separation of the particular constituent or constituents present in the extract.

I have, however, now discovered an improved method of segregating a desired constituent or constituents present in the extract phase, which comprises segregating the raffinate phase, separating the most paraffinic constituents therefrom, and utilizing these most paraffinic constituents for further fractionating the extract oil phase. The process of my invention may be readily understood by reference to the drawing illustrating one embodiment of the same. For the purpose of description it is assumed that the feed oil comprises a petroleum oil boiling in the range from about 200° F. to about 250° F., and that it is desired to segregate the toluene therefrom. The feed oil is introduced into primary treating zone 1 which is taken to be a countercurrent treating tower, by means of feed line 2. The feed oil flows upwardly through tower 1 and contacts downflowing solvent which is introduced into zone 1 by means of solvent feed line 3. For the purpose of description, the solvent is taken to be liquid sulfur dioxide. Temperature and pressure conditions are adjusted in zone 1 to secure the formation of a highly paraffinic raffinate phase and a highly aromatic solvent extract phase.

The raffinate phase is withdrawn from primary treating zone 1 as a side stream by means of line 4 and passed to solvent recovery zone 5 in which the solvent is separated from the raffinate oil. This may be accomplished by any suitable means, such as by washing or by re-extracting with a secondary solvent, but is preferably accomplished by a distillation operation. The raffinate oil product is removed from solvent recovery zone 5 by means of line 6 while the solvent is removed by means of line 7 and passed to solvent storage zone 10. A phase highly paraffinic in character is removed from primary treating zone 1 by means of line 8 and introduced into secondary treating zone 9 which comprises a countercurrent treating tower.

In secondary treating zone 9 the highly paraffinic phase removed from primary treating zone 1 is countercurrently treated with solvent withdrawn from solvent storage zone 10 which is introduced into secondary treating zone 9 by means of line 11. Temperature and pressure conditions are adjusted in secondary treating zone 9 so that a relatively small raffinite phase highly paraffinic in nature is removed by means of line 12, and a solvent extract phase is removed by means of line 13. The solvent phase removed by means of line 13 is preferably introduced as solvent in treating zone 1 although the same may be passed to separation zone 30, the solvent returned to storage zone 10 by means of line 14 and the oil withdrawn from the system by means of line 31. Fresh solvent is introduced into zone 1 by means of line 15.

The phase comprising the most paraffinic type constituents is removed by means of line 12, passed to solvent recovery zone 16 wherein the solvent is separated from the highly paraffinic constituents by suitable means, and returned to solvent storage zone 10 by means of line 17. The most paraffinic constituents free of solvent are removed from zone 16 by means of line 18 and handled as hereinafter described.

The solvent extract phase is removed from primary treating zone 1 and passed through line 32 into the upper section of tertiary treating zone 19 which for the purpose of description is taken to be a countercurrent treating tower. In tertiary treating zone 19 the solvent extract phase removed from primary treating zone 1 is countercurrently treated with the most paraffinic constituents of the feed oil which are removed and segregated in solvent recovery zone 16. These constituents are introduced into tertiary treating zone 19 by means of line 20. Under certain conditions it may be desirable to pass the phase removed from secondary treating zone 9 by means of line 12 around solvent recovery zone 16 by means of line 21 and to introduce this phase directly into tertiary treating zone 19. Paraffinic liquid from the top of teritary treating zone 19 is returned to the bottom of primary treating zone 1 for re-treatment by means of line 33. A solvent extract phase is removed from tertiary treating zone 19 by means of line 22 and passed to solvent recovery zone 23 wherein the solvent is separated from the extract oil constituents. The extract oil constituents are removed by means of line 24 while the solvent is removed by means of line 25 and returned to solvent storage zone 10. A solvent extract phase highly aromatic in nature and having a high concentration of toluene is removed from tertiary treating zone 19 by means of line 26 and passed to solvent recovery zone 27 wherein the solvent is removed by suitable means and separated by means of line 28. The extract constituents highly aromatic in nature and containing a high percentage of toluene are removed by means of line 29.

The process of the present invention may be widely varied. It is to be understood that the respective zones may comprise any suitable number and arrangement of units. Although the operation may be adapted in the treatment of any oil, it is particularly adapted for the treatment of relatively narrow boiling fractions in which the molecular weights of the constituents do not vary excessively, and in which the molecular structures of the respective constituents are quite similar. It is especially suited for segregating conjugated diolefin constituents from feed fractions comprising hydrocarbon constituents containing four and five carbon atoms in the molecule. It is particularly suitable for the segregation of toluene from feed oils boiling in the general range from about 200° F. to about 250° F. Although the process may be adapted when utilizing any type of selective solvent as, for example, furfural, nitro benzene, aniline, methylcellosolve, and the like, we have found that particularly desirable results are secured when the solvent comprises sulfur dioxide or phenol.

What I claim as new and wish to protect by Letters Patent is:

1. Improved countercurrent solvent treating process which comprises introducing a feed oil into the bottom of a primary treating zone, introducing a solvent selected from the class of solvents which have a preferential selectivity for the relatively more aromatic type constituents as compared to the relatively more paraffinic type constituents into the top of said primary treating zone, maintaining conditions to secure phase separation, withdrawing a solvent extract phase from the bottom of the primary treating zone, withdrawing a phase containing the most paraffinic constituents from the top of the primary treating zone, withdrawing a raffinate phase comprising paraffinic constituents from an intermediate point of the countercurrent primary treating zone, treating said raffinate phase and recovering the solvent therefrom, and subjecting said solvent extract phase to treatment with paraffinic constituents from said phase comprising the most paraffinic constituents in a secondary treating zone under conditions to produce a secondary solvent extract phase, the constituents of which are highly aromatic in character.

2. Process as defined by claim 1, in which said solvent is liquid sulfur dioxide.

3. Solvent treating process which comprises countercurrently treating a feed oil in a primary treating zone with a solvent selected from the class of solvents which have a preferential selectivity for the relatively more aromatic type constituents as compared to the relatively more paraffinic type constituents under conditions to secure phase separation, withdrawing a solvent extract phase from the bottom of the primary treating zone, withdrawing a phase containing the most paraffinic constituents from the top of the primary treating zone, withdrawing a raffinate phase comprising paraffinic constituents from an intermediate point of the countercurrent primary treating zone, treating said raffinate phase and recovering the solvent therefrom, subjecting said phase comprising the most paraffinic constituents in a secondary treating zone to contact with fresh solvent under conditions to separate the most paraffinic constituents, segregating said most paraffinic constituents and treating said solvent extract phase removed from said primary treating zone in a tertiary treating zone with said most paraffinic constituents under conditions to segregate a phase containing highly aromatic constituents, separating said phase and segregating said highly aromatic constituents.

4. Process as defined by claim 3, in which said solvent is liquid sulfur dioxide.

HENRY J. HIBSHMAN.